United States Patent
Perez-Ramirez et al.

(10) Patent No.: US 12,081,561 B2
(45) Date of Patent: Sep. 3, 2024

(54) DETECTING CLOCK SYNCHRONIZATION ATTACKS IN TIME SENSITIVE NETWORKS USING KEY PERFORMANCE INDICATORS

(71) Applicant: Intel Corporation, Santa Clara, CA (US)

(72) Inventors: Javier Perez-Ramirez, North Plains, OR (US); Mikhail Galeev, Beaverton, OR (US); Marcio Juliato, Portland, OR (US); Christopher Gutierrez, Hillsboro, OR (US); Dave Cavalcanti, Portland, OR (US); Manoj Sastry, Portland, OR (US); Kevin Stanton, Hillsboro, OR (US); Vuk Lesi, Cornelius, OR (US)

(73) Assignee: INTEL CORPORATION, Santa Clara, CA (US)

( * ) Notice: Subject to any disclaimer, the term of this patent is extended or adjusted under 35 U.S.C. 154(b) by 295 days.

(21) Appl. No.: 17/483,723

(22) Filed: Sep. 23, 2021

(65) Prior Publication Data
US 2022/0014532 A1    Jan. 13, 2022

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
None
See application file for complete search history.

(56) References Cited

U.S. PATENT DOCUMENTS

2016/0103887 A1 * 4/2016 Fletcher ............... H04L 41/069
                                                             707/722

FOREIGN PATENT DOCUMENTS

EP      3503485 A1 *   6/2019      ............ H04L 47/20

OTHER PUBLICATIONS

Alghamdi, W., and Schukat, M., "Cyber Attacks on Precision Time Protocol Networks—A Case Study", Electronics 9, 1398 (2020) doi: 10.3390/electronics9091398, 25 pages.
Annessi, R., et al., "Encryption is Futile: Delay Attacks on High-Precision Clock Synchronization", Arxiv Cryptography and Security, 2018 [online] [retrieved on Jan. 5, 2022]. Retrieved from Internet URL: https://arxiv.org/pdf/1811.08569.pdf.
Brooks, S., and Uludag, E., "Time-Sensitive Networking: From Theory to Implementation in Industrial Automation", Intel White Paper WP-01279_1.0. no date given, 7 pages.
Cavalcanti, D., et al., "Wireless TSN—Definitions, Use Cases & Standards Roadmap" Avnu Alliance® White Paper Version #1.0— Mar. 4, 2020, 16 pages.
Gutierrez, CSV, et al., "Time-Sensitive Networking for robotics", [online] [retrieved on Jan. 5, 2022]. Retrieved from Internet URL: https://arxiv.org/pdf/1804.07643.pdf.

(Continued)

*Primary Examiner* — Brian Whipple
(74) *Attorney, Agent, or Firm* — KDW Firm PLLC

(57) ABSTRACT

Systems and methods to detect attacks on the clocks of devices. In time sensitive networks are described. Particularly, the disclosed systems and methods provide detection and mitigation of timing synchronization attacks based on key performance indicators related to the protecting transmission windows in data streams of the time sensitive networks.

24 Claims, 13 Drawing Sheets

(56) References Cited

OTHER PUBLICATIONS

EEE 1588-2019—IEEE Standard for a Precision Clock Synchronization Protocol for Networked Measruement and Control Systems, copyright 2022 IEEE.
IEEE 801.1Qbv—Enhancements for Scheduled Traffic standard, last modified Nov. 2016.
Eee 802.1AS—Timing and Synchronization standard, last modified Nov. 2010.
Itkin, E. and Wool, A., "A Security Analysis and Revised Security Extension for the Precision Time Protocol", [online] May 28, 2016 [retrieved on Jan. 5, 2022]. Retrieved from Internet URL:https://arxiv.org/pdf/1603.00707.pdf.
National Instruments CorpEngineer Ambitiously™, Controller Area Network (CAN) Overview white paper, [online] updated 2020 [retrieved on Jan. 5, 2022]. Retrieved from Internet URL: https://www.ni.com/en-us/innovations/white-papers/06/controller-area-network--can-overview.html.
Pseudorandom number generator, Wikipedia [online] last edited Dec. 2021 [retrieved on Jan. 5, 2022]. Retrieved from Internet URL: https://en.wikipedia.org/wiki/Pseudorandom_number_generator.
The Modbus Organization, Modbus Product News [online] Copyright 2005-2022 [retrieved on Jan. 5, 2022]. Retrieved from Internet URL: https://modbus.org/.
Thiele, D., et al., "Formal worst-case timing analysis of Ethernet TSN's time-aware and peristaltic shapers," 2015 IEEE Vehicular Networking Conference (VNC), Kyoto, Japan, pp. 251-258 Abstract.
Lisova et al., "Protecting Clock Synchronization: Adversary Detection through Network Monitoring" Journal of Electrical and Computer Engineering—vol. 2016, Jan. 1, 2016, pp. 1-13.
Lo Bello et al., "A Perspective on IEEE Time-Sensitive Networking for Industrial Communication and Automation Systems" Published Apr. 23, 2019—Proceedings of the IEEE, pp. 1094-1120.
E. Lisova et al., "Delay attack versus clock synchronization—A time chase," 2017 IEEE International Conference on Industrial Technology (ICIT), Toronto, ON, Canada, 2017, pp. 1136-1141.
Browne et al., "Key Performance Indicator (KPI) Stamping for the Network Service Header (NSH)" Published 2019—Computer Science—RFC, pp. 1-27.
European Search Report and Written Opinion for the European Application No. 22189480.1, mailed Jan. 31, 2023, 9 pages.

* cited by examiner

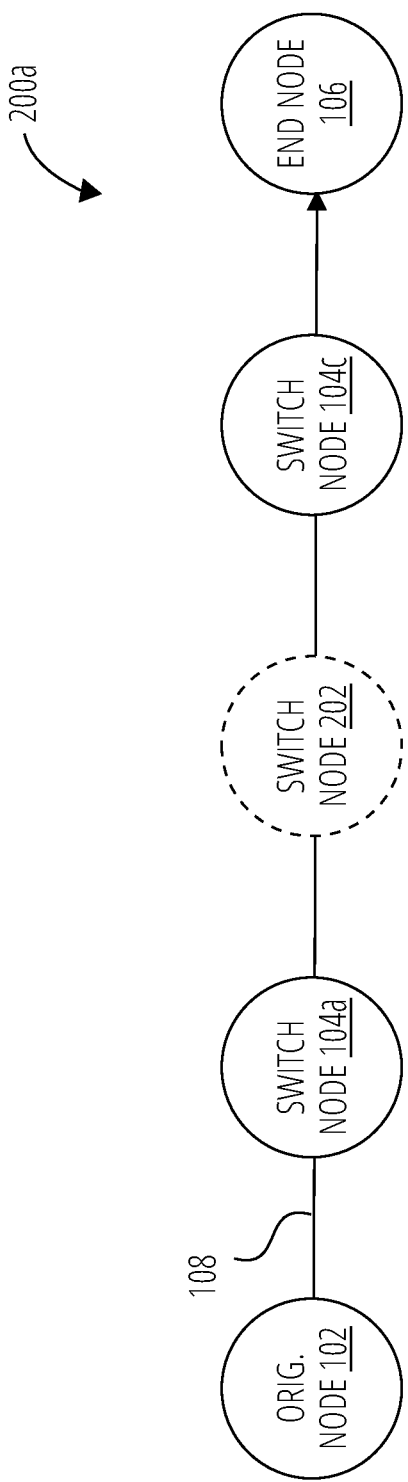
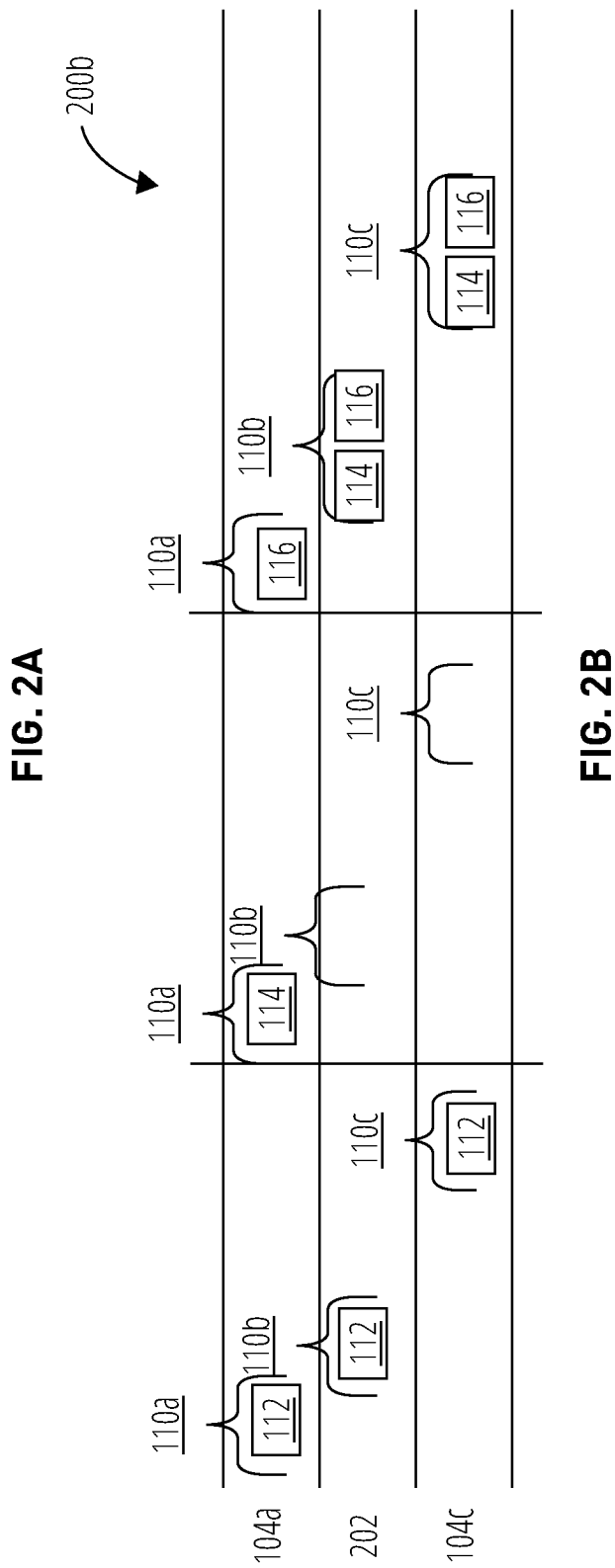
FIG. 2A
FIG. 2B

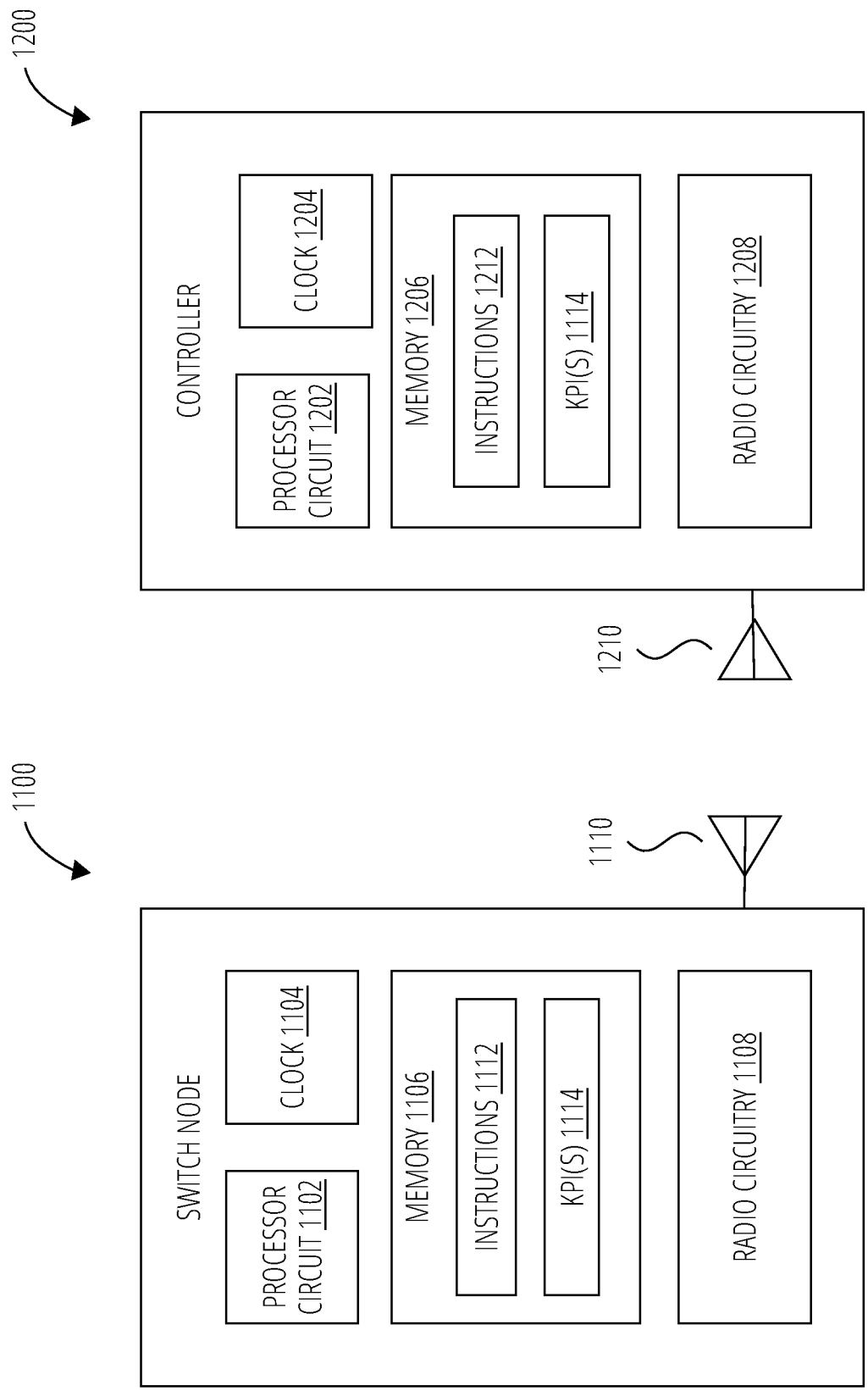

DETECTING CLOCK SYNCHRONIZATION ATTACKS IN TIME SENSITIVE NETWORKS USING KEY PERFORMANCE INDICATORS

BACKGROUND

Many computing systems require real-time safety critical features. For example, many autonomous systems, industrial systems, etc., require such systems to have real-time safety-critical features. This often necessitates that time performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles requires synchronization of sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-sensitive networking (TSN).

In general, TSN defines a set of standards (and amendments) with the aim to enable time synchronization and deterministic data delivery in converged networks where time-critical (TC) traffic coexists with other types of traffic. Thus, there is a need to provide security for TSN devices to mitigate the risks associated with disruption in TSN operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A illustrates a network 100a.
FIG. 2A illustrates network 200a.
FIG. 2B illustrates timing diagram 200b.
FIG. 4A illustrates a timing diagram 400a.
FIG. 4B illustrates a Qbv windows and change in KPIs for the timing diagram 400a.
FIG. 9A illustrates a timing diagram 900a.
FIG. 10A illustrates a timing diagram 1000a.
FIG. 11 illustrates a switch node 1100.
FIG. 12 illustrates a controller 1200.

DETAILED DESCRIPTION

The present disclosure is generally directed to reducing interference or attack vectors for systems operating based on TSN. As noted, TSN defines a set of standards (and amendments) with the aim to enable time synchronization and deterministic data delivery in converged networks where TC traffic coexists with other types of traffic. Various standards have been developed to address time-sensitive communications. Two of the more prominent standards for enabling time-sensitive communications are promulgated by the Institute of Electrical and Electronics Engineers (IEEE). For example, IEEE 802.1AS and IEEE 802.1Qbv provide systems and methods for synchronizing device clocks. In particular, IEEE 802.1AS provides a protocol for time synchronization across the network, where time sensitive devices (e.g., followers) synchronize to a leader clock; while IEEE 802.1Qbv provides for prioritizing TC traffic in the network switches using gate-controlled lists (GCLs).

Figure 1A:
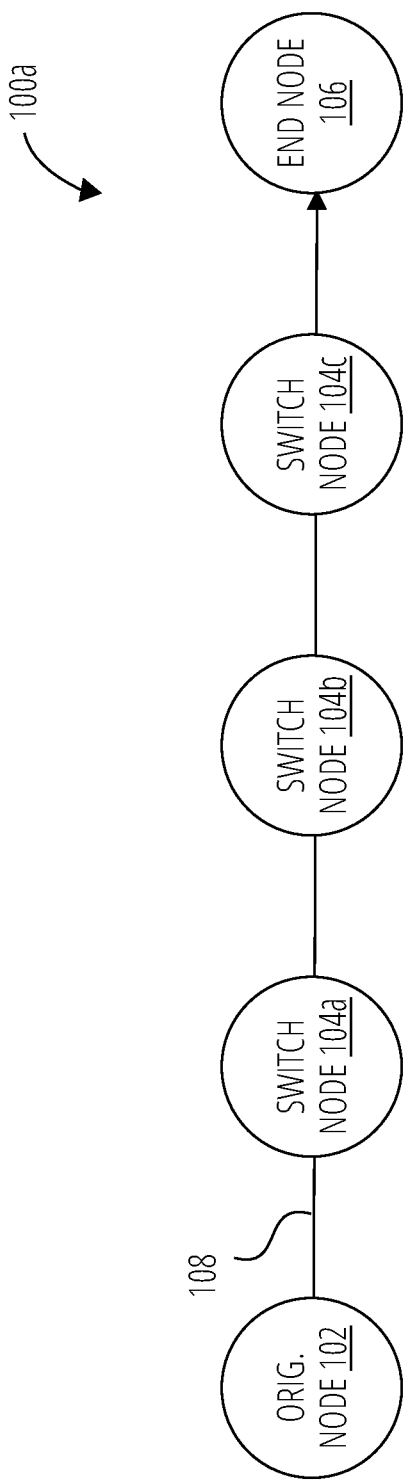

FIG. 1A depicts a network 100a implemented according to a TSN standard (e.g., IEEE 802.1AS, IEEE 802.1Qbv, or the like). As depicted, network 100a includes origination node 102, switch nodes 104a, 106, and 104b, and end node 108, all communicatively coupled via communication channel 110. It is noted that the number of nodes in network 100a is selected for purposes of clarity and not limitation. In practice, network 100a can include any number and combination of nodes (e.g., origination nodes, switches, end devices, etc.). Nodes in network 100a (e.g., origination node 102, switch node 104a, switch node 106, and switch node 104b, etc.) are provided a GCL table, which specifies timing for windows in which the nodes can transmit packets on communication channel 110.

Switch nodes 104a, 106, and 104b can be any number of devices in a network arranged to communicate, such as for example, electronic control units in an autonomous vehicle, an industrial system, a medical system, or the like. Additionally, communication channel 110 can be any of a variety of communication channels, including wired or wireless communication channels. In some implementations, all devices in network 100a will receive GCL tables. However, in some implementations, only origination nodes (e.g., origination node 102) and switching nodes (e.g., switch node 104a, etc.) receive GCL tables while destination devices (e.g., end node 108) do not receive a GCL table.

Figure 1B:
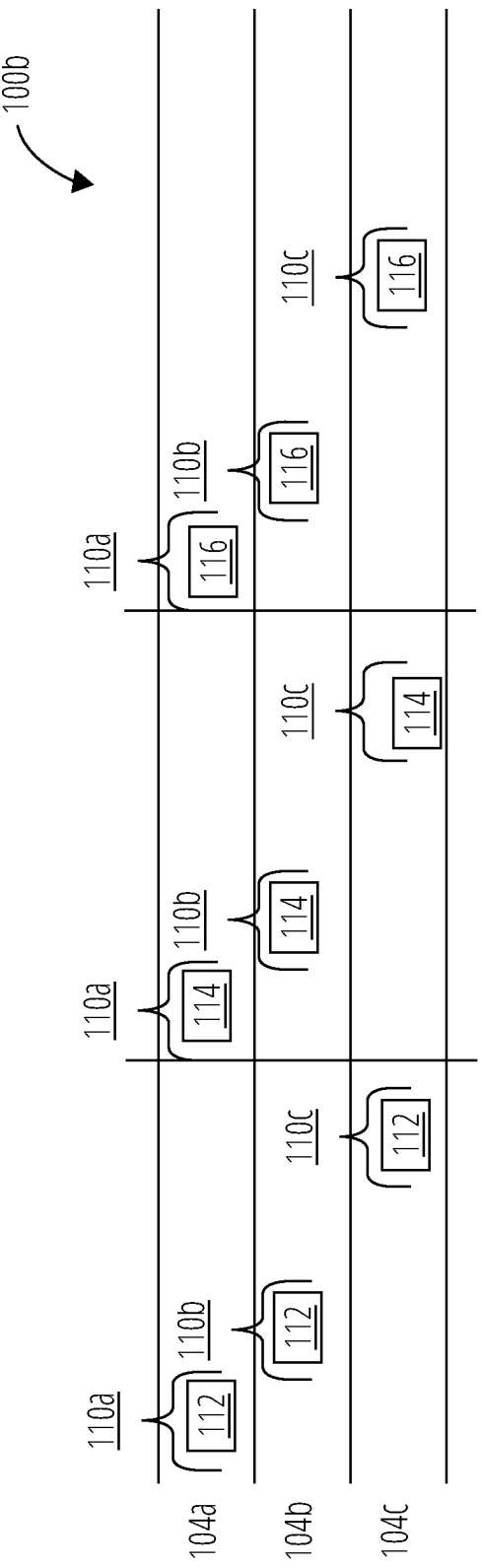
FIG. 1B illustrates a timing diagram 100b.

Typically, GCL tables are generated in a network controller (not shown) and are designed to prioritize TC traffic and prevent lower priority traffic from accessing communication channel 110, thus guaranteeing the timely delivery of TC packets within pre-configured time windows. FIG. 1B depicts a timing diagram 100b depicting communication windows (e.g., Qbv windows, or the like) for switches of network 100a based on GCL tables. In particular, timing diagram 100b depicts Qbv windows 112a, 112b, and 112c in which packets 114, 116, and 112c are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 114, etc.) during protected windows (e.g., Qbv window 112a, etc.), nodes in network 100a are time synchronized and scheduled to transmit TC packets (e.g., packet 114, etc.) using non overlapping protected windows (e.g., Qbv window 112a, etc.). It is to be appreciated that providing latency bounded communication (e.g., as depicted in timing diagram 100b) requires tight synchronization of time between nodes in network 100a. With such dependency on time synchronization, reliable TSN operation can be disrupted by attacking the timing of the network.

FIG. 2A depicts a network 200a, which is like network 100a except that switch node 106 is depicted as compromised. In particular, the clock (not shown) of switch node 106 can be attacked and compromised, thereby causing the Qbv window 112b associated with switch node 106 to be misaligned with respect to, and even overlap with, the protected windows of the other switch nodes in the data stream path (e.g., along communication channel 110).

FIG. 2B depicts timing diagram 200b illustrating Qbv window 112b misaligned with Qbv window 112a and Qbv window 112c and overlapping with Qbv window 112a. As a result, packets (e.g., packet 116 in the figure) arrive too late with respect to the attacked switch protected window (e.g., Qbv window 112b) causing them to be buffered and sent in the next protected window. As a result of the delay in transmitting packet 116, switch node 106 breaks the latency bound of the stream that it is serving and can result in errors or comprise the safety of the system in which the nodes are operating.

The present disclosure provides to detect attacks against networks operating under TSN protocols, such as, networks operating in accordance with IEEE 802.1Qbv. In particular, the present disclosure provides systems and methods to detect attacks that directly affect IEEE 802.1Qbv scheduling. In general, the present disclosure provides detection of time synchronization misbehavior in networks operating in accordance with TSN protocols based on attributes associated with a key performance indicator (KPI) or KPIs, or the TSN protocol. The present disclosure uses IEEE 802.1Qbv as the TSN protocol and describes KPIs associated with IEEE 802.1Qbv. However, it is noted that examples described herein can be applied to other TSN protocols different from IEEE 802.1Qbv.

With some examples, systems and methods are described that detect misbehavior of TSN compliant networks based on a KPI associated with (i) the delay time (DT) attribute to trigger detection of devices under attack when IEEE 802.1Qbv windows overlap over time and/or (ii) ingress time delay (I-DT) attribute to trigger detection of devices under attack when IEEE 802.1Qbv windows do not overlap over time.

The present disclosure provides KPIs with measurement attributes offering a higher granularity in the time domain, thus increasing the responsiveness of detecting threats. It is important to note that detecting attacks from metrics derived from the scheduling solution (IEEE 802.1Qbv) has a detection speed advantage over other attack detection methods since the clock synchronization interval for IEEE 1588 and IEEE 802.1AS is typically in the order of seconds to 100s of milliseconds while scheduled windows for IEEE 802.1Qbv can have scheduling intervals 2 orders of magnitude lower (e.g., periodicity in the order of single digit milliseconds or even microseconds).

Figure 3:
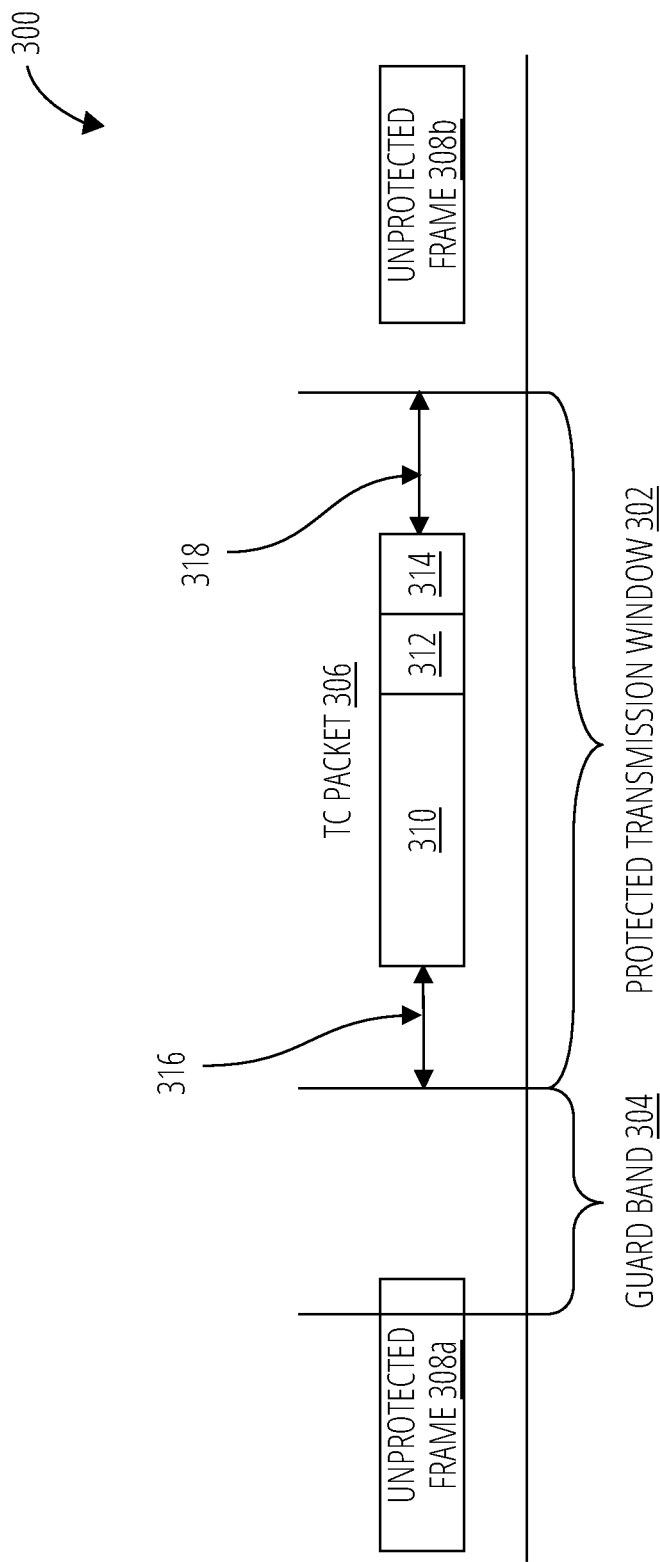
FIG. 3 illustrates a timing diagram 300.

FIG. 3 illustrates an example timing diagram 300 depicting a protected transmission window 302 in which a TC packet 306 is transmitted. In particular, timing diagram 300 depicts KPIs, in accordance with non-limiting example(s) of the present disclosure. Protected transmission window 302 can be based on a GCL table as outlined above. During protected transmission window 302, a device (e.g., switch node 104a, or the like) can transmit TC packets, such as TC packet 306. Whereas outside of protected transmission window 302, unprotected frames 308a and/or 308b can be transmitted. Often, protected transmission window 302 can be proceeded by guard band 304. TC packet 306 can include data frame 310, short inter frame spacing 312, and acknowledgment 314.

Timing diagram 300 further TC packet 306 relative to the timing of the protected transmission window 302. In particular, this figure depicts delay time 316 (DT) which equals the time the protected transmission window 302 starts ($TW_{start}$) minus the time the TC packet 306 starts ($T_{start}$), or said differently the delay between the start of protected transmission window 302 and the start of TC packet 306. Likewise, timing diagram 300 depicts time buffer 318 (TB) which equals the time the protected transmission window 302 ends ($TW_{end}$) minus the time the TC packet 306 ends ($T_{end}$), or said differently the delay between the end of the TC packet 306 and the end of protected transmission window 302 time buffer (TB)). It is noted that the KPIs depicted in FIG. 3 and used herein to describe various illustrative examples of the disclosure can include delay time 316 and time buffer 318, or can include other KPIs that characterize the performance of a TSN network in real time. However, KPIs delay time 316 and time buffer 318 are used in this disclosure for purposes of clarity of presentation.

Figure 4A:
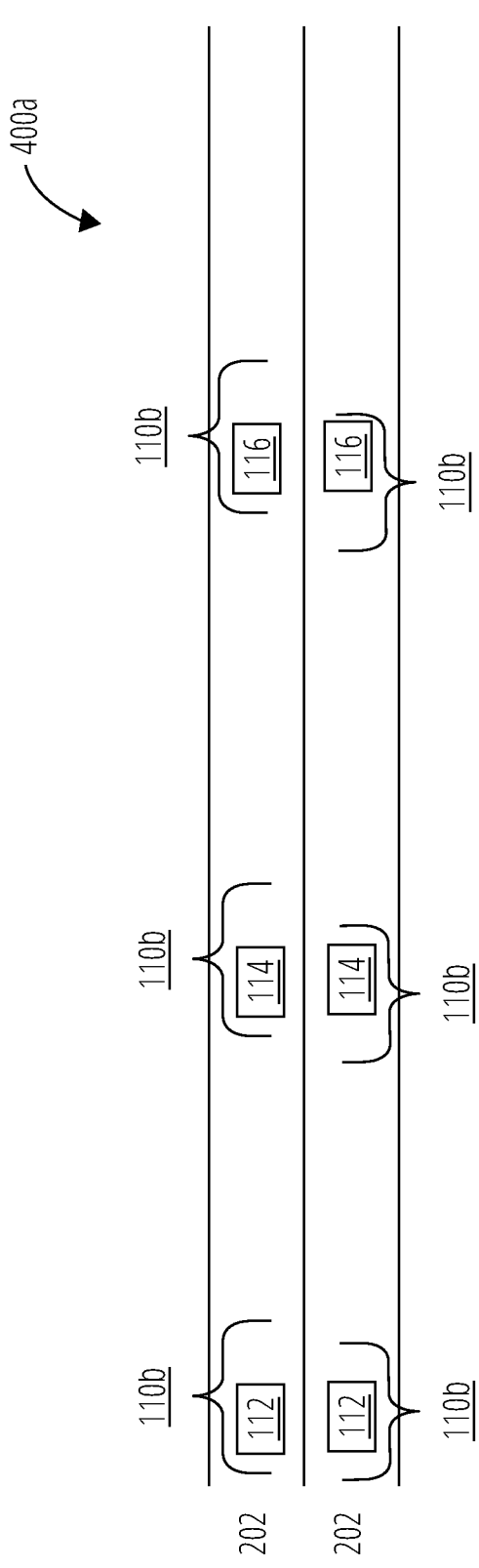
Figure 4B:
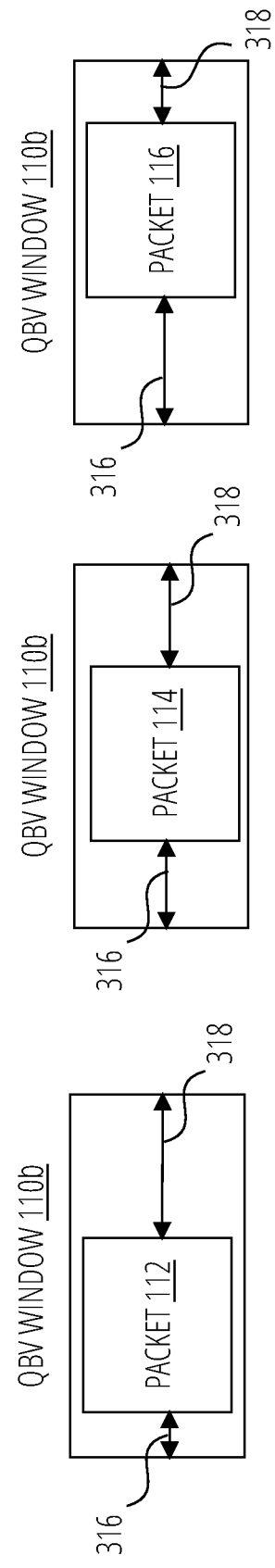

FIG. 4A depicts a timing diagram 400a illustrating the Qbv window 112b for switch node 106 from timing diagram 100b and timing diagram 200b. That is, timing diagram 400a compares the KPIs for 106 when the switch node is not compromised (e.g., timing diagram 100b) with when the switch is compromised (timing diagram 200b). To further illustrate the difference, Qbv window 112b from timing diagram 200b are reproduced in FIG. 4B. FIG. 4B further depicts packet 114, packet 116, and packet 118 overlaid within Qbv window 112b. Additionally, KPIs delay time 316 and time buffer 318 are illustrated.

As can be seen, clock synchronization of nodes in a network (e.g., network 200a) and particularly the clock synchronization of switch node 106 affects KPIs associated with that node. As can be observed in FIG. 4A and FIG. 4B, an increase in the clock of switch node 106 causes its Qbv windows 112b to be shifted to the left. This shift or misalignment causes the KPIs to increase and decrease, respectively, over time. The present disclosure provides that these unexpected changes in one or both KPIs are used to detect malfunctioning nodes in a network, or nodes that may be under a time synchronization attack.

Figure 5:
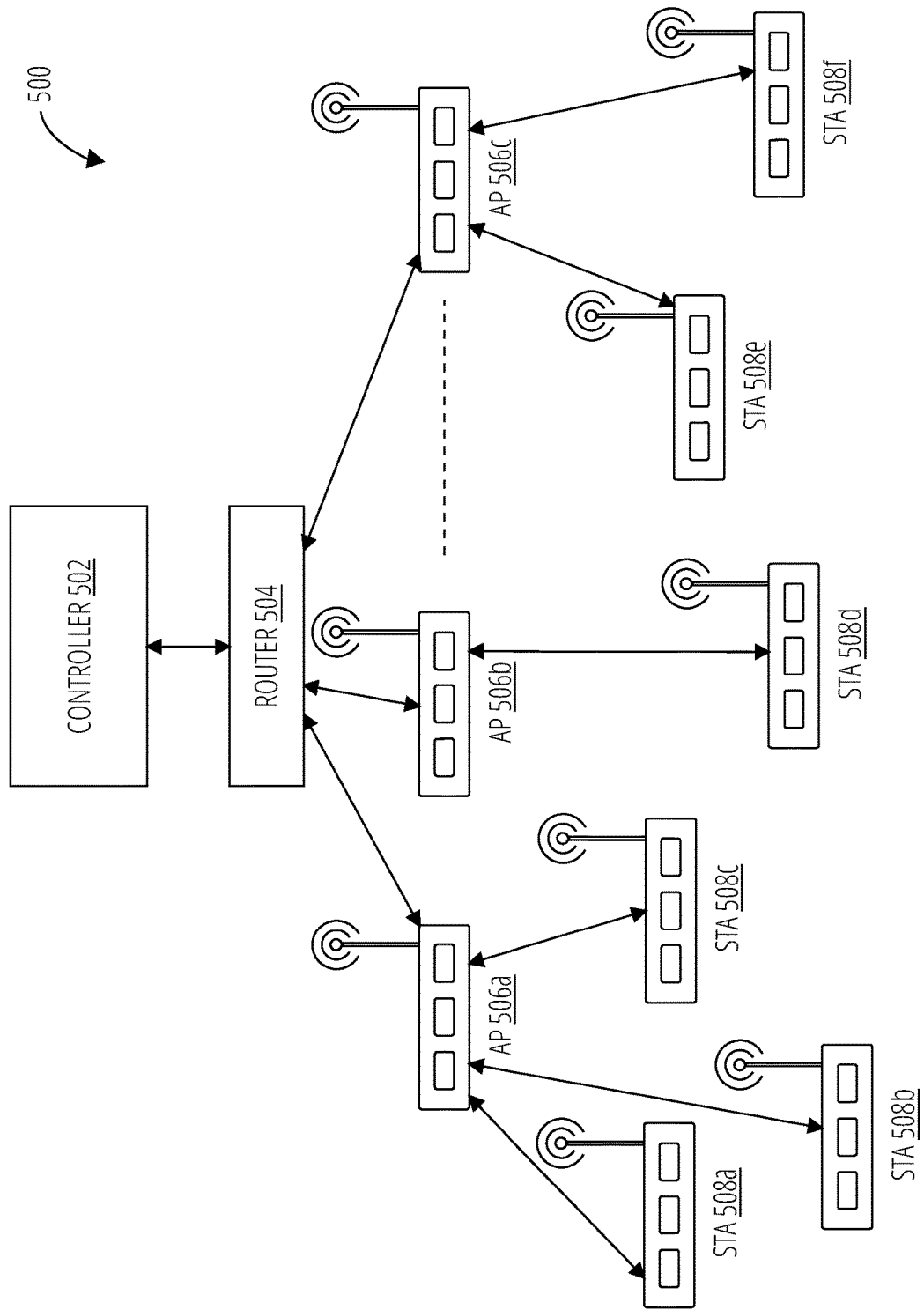
FIG. 5 illustrates a TSN network 500.

FIG. 5 illustrates a TSN network 500 in which an attack against time synchronization can take place. TSN network 500 depicts a controller 502 coupled to a number of access points, such as access point (AP) 506a, AP 506b, and AP 506c, via router 504. Further, TSN network 500 depicts stations wirelessly via access points. In particular, TSN network 500 depicts station (STA) 508a, STA 508b, and STA 508c coupled to AP 506a; STA 508d coupled to AP 506b; and STA 508e and STA 508f coupled to AP 506c.

TSN network 500 can be deployed in any of a variety of settings (e.g., industrial, warehousing, retail, autonomous vehicles, or the like). As depicted, the access points are coupled to controller 502 via a wired connection (e.g., Ethernet, or the like). As such, these follower devices (e.g., AP 506a, AP 506b, and AP 506c, or the like) can be synchronized to the controller 502 using 802.1AS over wire. Said differently, clocks of AP 506a, AP 506b, and AP 506c can be synchronized to the clock of controller 502 via 802.1AS over a wired connection (e.g., Ethernet, or the like).

Additionally, follower stations (e.g., STA 508a, STA 508b, STA 508c, STA 508d, STA 508e, and STA 508f, or the like) can be synchronized to controller 502 through the access points using 802.1AS over wireless. Said differently, clocks of STA 508a, STA 508b, STA 508c, STA 508d, STA 508e, and STA 508f can be synchronized to the clock of controller 502 via 802.1AS over a wireless connection (e.g., 802.11, or the like).

Controller 502 can be configured to detect abnormal behavior of clock synchronization in network devices, such as, router 504, AP 506a to AP 506c, and STA 508a to STA 508f. With some examples, TSN network 500 configured to provide a number of data streams (not shown) and further to provide QoS requested by each such data stream. Further, some of the data streams are selected to also provide network KPI monitoring. In one example, IEEE 1102.1AS packets used for time synchronization can have a dedicated Qbv schedule for the dual purpose of avoiding interference with other TC traffic and enable KPI monitoring of time synchronization. In another example, TC streams with the sole purpose of monitoring KPIs of the TSN network 500 can be defined. In this case, monitoring stream routes are determined alongside the rest of the streams and GCL tables are computed (e.g., by controller 502) and distributed across the network. Details on defining streams and generating and distributing GCL tables are not provided in this disclosure. However, the device (e.g., controller 502, or the like) generating Qbv schedules should be aware of the presence of other streams, particularly streams used for monitoring network KPIs such that the right stream paths and GCL tables are defined to avoid coexistence in the switch with other TC traffic.

Controller 502 can be a central user configurator (CUC) and/or a centralized network configurator (CNC) and can determine KPI monitoring capabilities of the TSN network 500. Based on this information, controller 502 indicates the network measurements and attributes it is expecting to receive. Once the configuration is completed, TC and non-TC traffic starts to flow in the TSN network 500. During this time, measurements (e.g., KPIs) are collected in each capable network device (e.g., router 504, AP 506a to access point (AP) 506c, STA 508a to 508f, etc.). Measurements are time stamped and stored in each network device and sent to the controller, periodically, upon request, at a fixed interval, upon occurrence of a condition, or the like. In some examples, nodes (e.g., router 504, AP 506a to 506c, STA 508a to station (STA) 508f, or the like) include circuitry and memory comprising instructions that when executed by the circuitry cause the circuitry to process the measurements, for example, to reduce the amount of stored data. Such processing can include, for example, a moving average window of the recorded parameters.

Controller 502 includes circuitry and memory comprising instructions that when executed cause the circuitry to collect and aggregate measurements from different elements of TSN network 500. Controller 502 is further configured (e.g., via the circuitry executing instructions, or the like) process the measurements to detect the presence of clock anomalies associated to device malfunction and/or to clock synchronization attacks.

With some examples, controller 502 can be segregated from other elements in the TSN network 500, for example, to place controller 502 out of reach of attackers such that controller 502 is immune to the attacks affecting the network node. Though not the focus of the present disclosure, such isolation of controller 502 can be accomplished through a variety of methods. In some instantiations, it is possible to utilize hardware already implementing the TSN functions (e.g., time stamping, or the like) to perform the time measurements. In other embodiments, a software-based solution with privilege separation can be utilized, in which inner rings of the operating system (e.g. ring 0) perform the measurements while other TSN functions execute on less privileged rings (e.g. ring 3). As a consequence, even when the applications running on ring 3 of node is under attack, it would not impact the monitoring system. Examples are not limited in this context.

Figure 6:
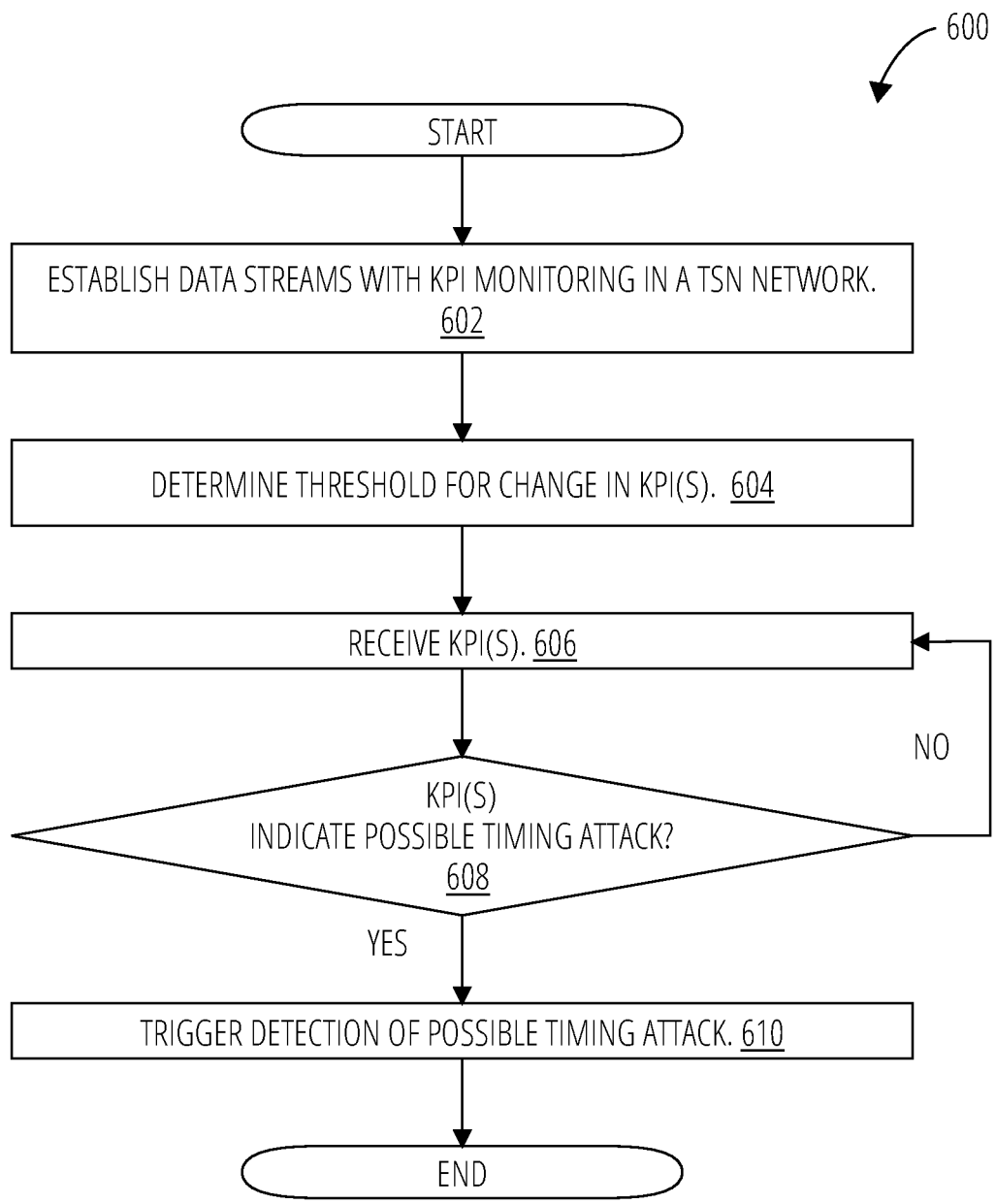
FIG. 6 illustrates a logic flow 600.

FIG. 6 illustrates a logic flow 600 that can be implemented by to detect timing attacks, in accordance with non-limiting example(s) of the present disclosure. Logic flow 600 can be implemented by a system providing TSN capabilities, such as, network 100a and/or TSN network 500. Logic flow 600 can begin at block 602 "establish data streams with KPI monitoring in a TSN network" data streams with KPI monitoring in a TSN network can be established. For example, as outlined above, multiple data streams in a TSN network can be established where some data streams provide monitoring of KPIs (e.g., delay time 316 and/or time buffer 318). In particular, circuitry of controller 502 can execute instructions (e.g., stored in memory of controller 502, or the like) to cause controller 502 to provision data streams in TSN network 500 where some (or all) of the data streams provide indications of KPIs delay time 316 and/or time buffer 318.

Continuing to block 604 "determine threshold for change in KPI(s)" threshold levels for the KPI(s) can be determined. For example, circuitry of controller 502 can execute instructions (e.g., stored in memory of controller 502, or the like) to cause controller 502 to derive a mean ($\mu_{DT}$, $\mu_{TB}$, etc.) and standard deviation ($\sigma_{DT}$, $\sigma_{TB}$, etc.) of delay time 316 and/or time buffer 318. In some examples, controller 502 can set the threshold ($Threshold_{DT}$, $Threshold_{TB}$, etc.) for change in KPI(s) as a deviation from a multiple of the standard deviation (e.g., $Threshold_{DT}=3*\sigma DT$, or the like). Additionally, with some examples, controller 502 can track a number of detected positive or negative events, or said differently controller 502 can track the number of times that the measured KPI is within the threshold (negative events or $C^-$) and the number of times that the measured KPI is outside the threshold (positive events or $C^+$). Furthermore, with some examples, controller 502 can determine a threshold based on machine learning applied over a data set comprising historical KPIs for the TSN or for a TSN like the TSN to be monitored.

Continuing to block 606 "receive KPI(s)" the KPI(s), during operation of the network, can be received. For example, controller 502 can receive indications of delay time 316 and/or time buffer 318 from nodes in TSN network 500 (e.g., router 504, AP 506a, STA 508a, etc.). With some examples, controller 502 can receive indication of raw values of the KPI(s) while in other examples, the nodes can process the KPI(s) and controller 502 can receive an indication of the processed KPI(s). As a specific example, nodes in TSN network 500 can derive a moving average window ($W_{DT}(t)$, $W_{TB}(t)$, etc.) of the collected delay time 316 and/or time buffer 318 and provide an indication of the moving average window to controller 502.

Continuing to decision block 608 "KPI(s) indicate a possible timing attack?" a determination of whether the KPI(s) indicate a possible timing attack is made. For example controller 502 can determine whether the KPI(s) have changed by the threshold (e.g., determined at block 604) is made. For example, controller 502 can compare $W_{DT}(t)$ to $\mu_{DT}$ and/or compare $W_{TB}(t)$ to $\mu_{TB}$ to determine whether the KPI(s) have changed by the threshold. As a specific example, controller 502 can determine whether $|W_{DT}(t)-\mu_{DT}|>Threshold_{DT}$ and can update the count of positive or negative events (e.g., $C^+$, $C^-$, etc.) based on the result. Additionally, controller 502 can recalculate the mean of the KPI(s) and/or can update the mean based on the moving average window. As a specific example, controller 502 can set $\mu_{DT}=W_{DT}(t)$. In some examples, when the threshold condition $|W_{DT}(t)-\mu_{DT}|>\text{Threshold}_{DT}$ is met then controller 502 can update $\mu_{DT}$ as $\mu_{DT}=W_{DT}(t)$.

Further, at decision block 608, controller 502 can determine whether to a time synchronization attack occurs based on the count of positive and negative events. For example, controller 502 can determine whether $|C^+ - C^-| > C_{th}$, where $C_{th}$ is a threshold absolute number of combined positive and/or negative events indicating that the subtraction of negative events from positive events reaches a threshold positive or negative number. $C_{th}$ can be selected to trigger detection before packets cross the boundary between adjacent Qbv windows, or the like; thereby allowing the network to mitigate attacks before they affects the normal operation of the network.

Logic flow 600 can continue to block 610 from decision block 608 or can return to block 606. In particular, logic flow 600 can return to block 606 from decision block 608 based on a determination that the KPI(s) do not indicate a possible timing attack while logic flow 600 can continue to block 610 from decision block 608 based on a determination that the KPI(s) do indicate a possible timing attack. At block 610 "trigger detection of possible timing attack" controller 502 can trigger a detection of a possible timing attack. For example, controller 502 can create and send an alert to a monitoring entity (not shown) that a timing attack is detected.

Figure 7:
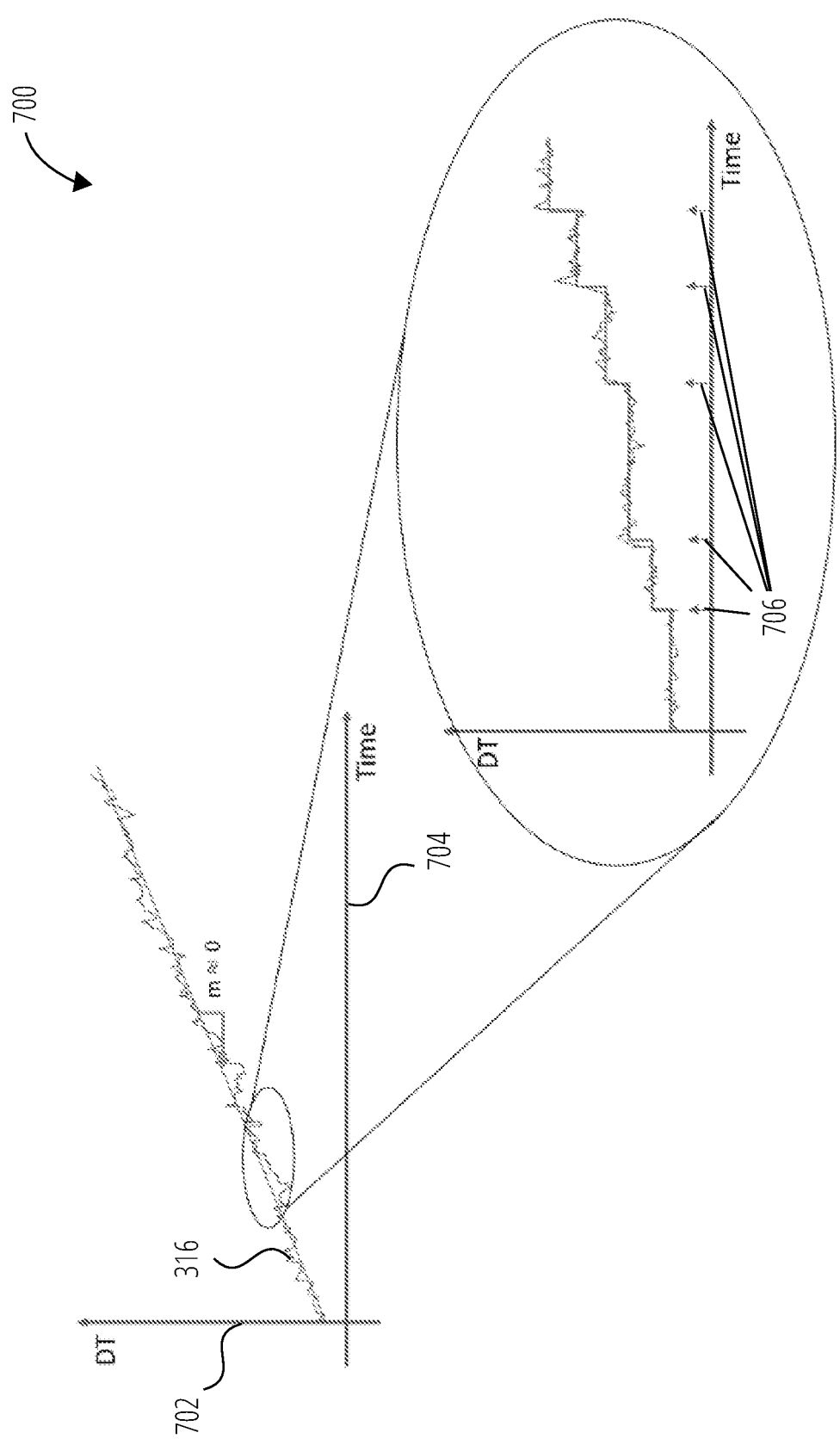
FIG. 7 illustrates a plot 700.

FIG. 7 depicts a plot 700 showing a KPI on the Y axis 702 and time on the X axis 704. In particular, plot 700 depicts the value of delay time 316 over time. In some examples, the clock of a target is steadily increased (or decreased) over time by an attacker. For example, FIG. 4B depicts the clock of switch node 106 being slowly increased over time resulting in gradual changes to delay time 316 and time buffer 318 associated with switch node 106. Often, attackers can perform such attacks over long periods of time in order to avoid detection. For example, FIG. 7 depicts the plot 700 of delay time 316 where the slope (m) is substantially 0. However, the present disclosure provides the windowed time average of KPI(s) (e.g., $W_{DT}$, $W_{TB}$, etc.), which removes the effect of random noise present in KPI measurements. Instead of constantly storing and analyzing KPIs, the present disclosure provides that events corresponding to an increase or decrease in the KPI are used to characterize and eventually trigger the presence of a time synchronization attack (e.g., as outlined with respect to FIG. 6 and logic flow 600).

Accordingly, the present disclosure provides that small increments in clock speed that are introduced (e.g., by an attacker) causing misalignment of scheduling (e.g., Qbv schedule, or the like) and transmitted packets are captured as increase or decrease events 706.

Figure 8:
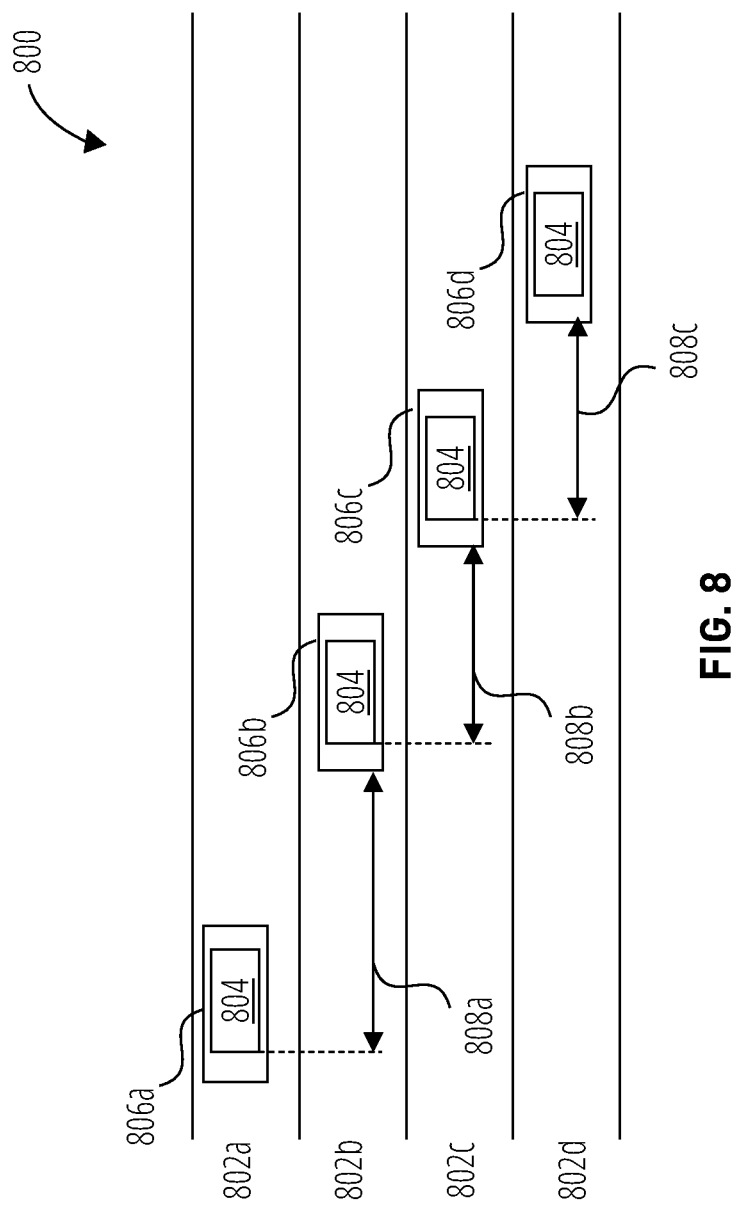
FIG. 8 illustrates a timing diagram 800.

FIG. 8 depicts a timing diagram 800 illustrating switch nodes 802a, 802b, 802c, 802d transmitting packet 804 in a data stream. Packets 804 are transmitted by switch nodes 802a, 802b, 802c, and 802d in Qbv windows 806a, 806b, 806c, and 806d, respectively. It is noted however, that Qbv windows 806a, 806b, 806c, and 806d do not overlap. In some embodiments, Qbv windows 806a, 806b, 806c, and 806d will not overlap, even under time synchronization attacks. As such, using KPIs 316 and/or 318 cannot be used to detect the attack as outlined above. Another KPI, ingress time different (I-TD) is described herein, which can be used to detect time synchronization attacks (e.g., via logic flow 600, or the like). I-TD is defined as the time difference between the packet arrival time and the start of the next protected window scheduled for its transmission. For example, I-TDs 808a, 808b, and 808c are depicted in this figure.

Figure 9A:
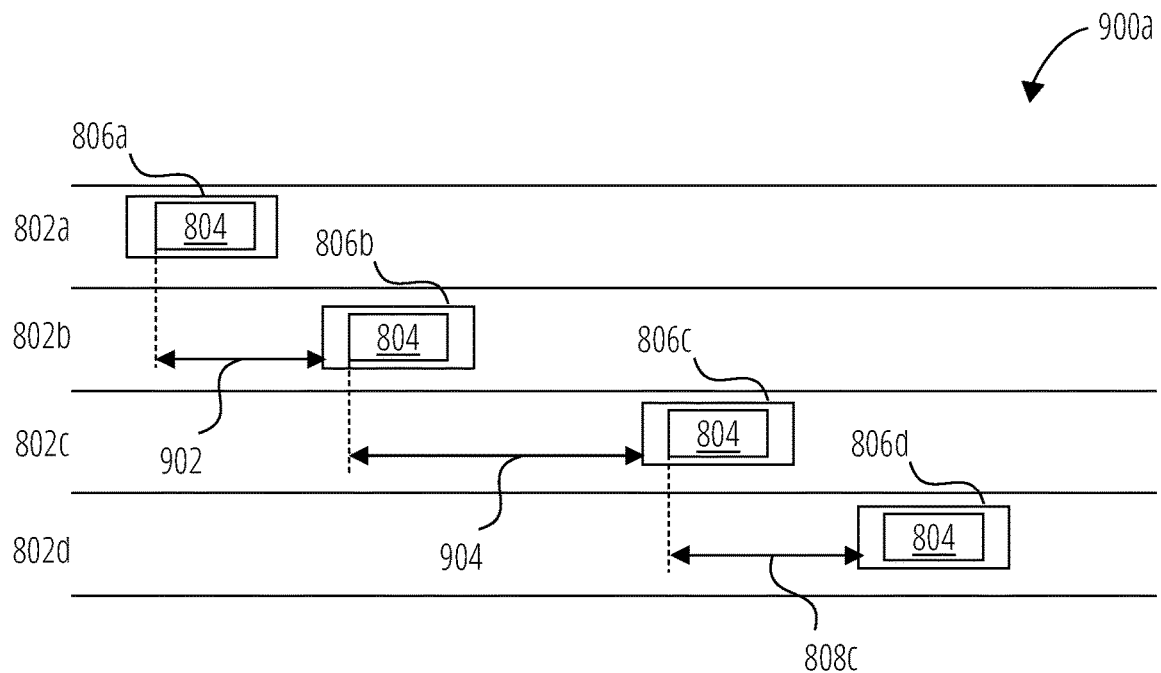

FIG. 9A depicts a timing diagram 900a illustrating switch nodes 802a, 802b, 802c, and 802d transmitting packet 804 in a data stream in Qbv windows 806a, 806b, 806c, and 806d like is depicted in timing diagram 800 of FIG. 8. However, in FIG. 9A and timing diagram 900a, switch node 802b is compromised and the Qbv window 806b is shifted such that I-TD 902 is different (e.g., smaller than) I-TD 808a. It is to be appreciated that at the beginning of the attack the I-TD of the switch after the attacked switch will also be effected. For example, I-TD 904 is longer than I-TD 808b. However, over time the attack on one switch (e.g., switch node 802b, or the like) will propagate to switches downstream (e.g., 802c, etc.) and the I-DT of the downstream switches will stabilize.

Figure 9B:
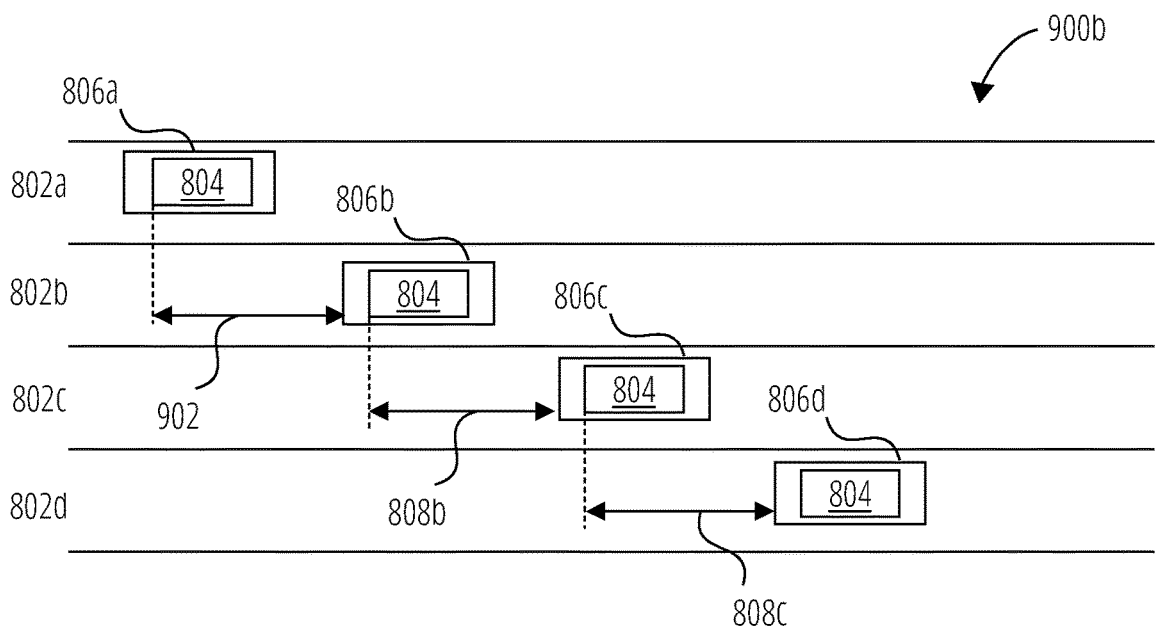
FIG. 9B illustrates a timing diagram 900b.

FIG. 9B illustrates timing diagram 900b which shows I-TD for switch node 802c has stabilized to I-TD 808b as depicted in timing diagram 800 of FIG. 8, indicating that the attack on switch node 802b has propagated downstream. However, I-TD 902 is still different from I-TD 808a, indicating that switch node 802b is under attack while switch node 802c is not.

Figure 10A:
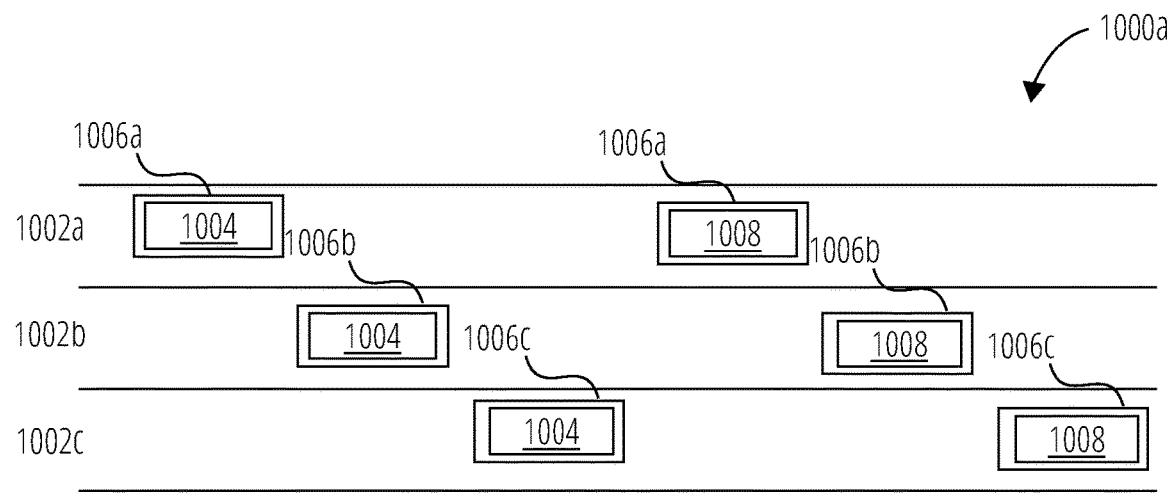

As noted above, with some implementations, data steams can be provisions solely for the purpose of monitoring the performance of the TSN network. With some examples, such streams are configured with schedules (e.g., GCL tables, or the like) designed to achieve the lowest latency possible in a talker/listener route. Said differently, in some examples, the windows (e.g., Qbv windows, or the like) are consecutively schedules with an aggressive window size. FIG. 10A depicts a timing diagram 1000a for such a data stream. This figure illustrates switch nodes 1002a, 1002b, and 1002c transmitting packets 1004 and 1008 in a data stream in protected windows (e.g., Qbv window 1006a, 1006b, and 1006c. As can be seen, Qbv windows 1006a, 1006b, and 1006c are configured such that the windows are sized close to the packet size and/or with little space between windows. As such, minor changes in time synchronization accuracy will have large impacts in the expected packet delivery rate (PDR), which could trigger detection of time synchronization issues in the network. More specifically, PDR can be a KPI for purposes of attack detection as described herein.

Figure 10B:
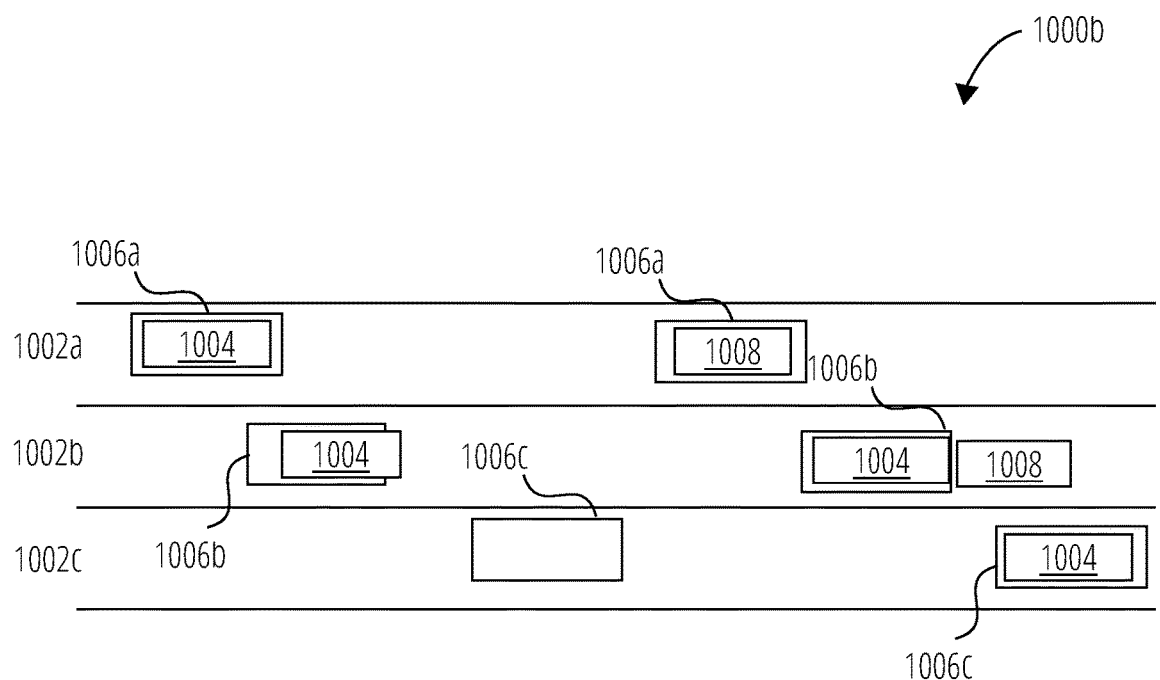
FIG. 10B illustrates a timing diagram 1000b.

For example, FIG. 10B illustrates timing diagram 1000b which shows switch nodes 1002a, 1002b, and 1002c transmitting packets 1004 and 1008 in a data stream in Qbv window 1006a, 1006b, and 1006c like is depicted in timing diagram 1000a of FIG. 10A. However, as noted small changes in time synchronization (e.g., Qbv window 1006b moved slightly) as depicted in FIG. 10B will result in a reduction in PDR. In particular, packet 1004 is buffered and transmitted in the next open window, thereby forcing packet 1008 to be buffered not transmitted. As such, the PDR is reduced. In some examples a PDR less than a threshold amount (e.g., 60% to 80%) in the data streams dedicated to monitoring performance can be used to indicate a time synchronization attack.

FIG. 11 and FIG. 12 depict a switch node 1100 and controller 1200, respectively. The switch node 1100 of FIG. 11 could be one of the switches in a TSN network (e.g., router 504, AP 506a, STA 508a, etc.). Switch node 1100 includes a processor circuit 1102, a clock 1104, memory 1106, radio circuitry 1108, and an antenna 1110. Memory stores instructions 1112 and KPI(s) 1114. During operation, processor circuit 1102 can execute instructions 1112 to cause switch node 1100 to determine KPI(s) 1114 (e.g., from measurements of performance of the data stream as described herein). In some examples, processor circuit 1102 can execute instructions 1112 to cause switch node 1100 to process KPI(s) as described herein (e.g., determine windowed averages of delay time 316, time buffer 318, or the like). Furthermore, processor circuit 1102 can execute instructions 1112 to cause switch node 1100 to send, via radio circuitry 1108 and antenna 1110, the KPI(s) 1114 (or processed KPI(s) 1114) to controller 1200.

The controller 1200 of FIG. 12 could be controller 502 of FIG. 5. As depicted in FIG. 12, controller 1200 includes processor circuit 1202, clock 1204, memory 1206, radio circuitry 1208, and antenna 1210. Memory 1206 stores instructions 1212 and KPI(s) 1114. During operation, processor circuit 1202 can execute instructions 1212 to cause controller 1200 to receive, via radio circuitry 1208 and antenna 1210, KPI(s) 1114 from switch nodes (e.g., switch node 1100, or the like) and/or process KPI(s) 1114 and outlined herein.

Figure 13:
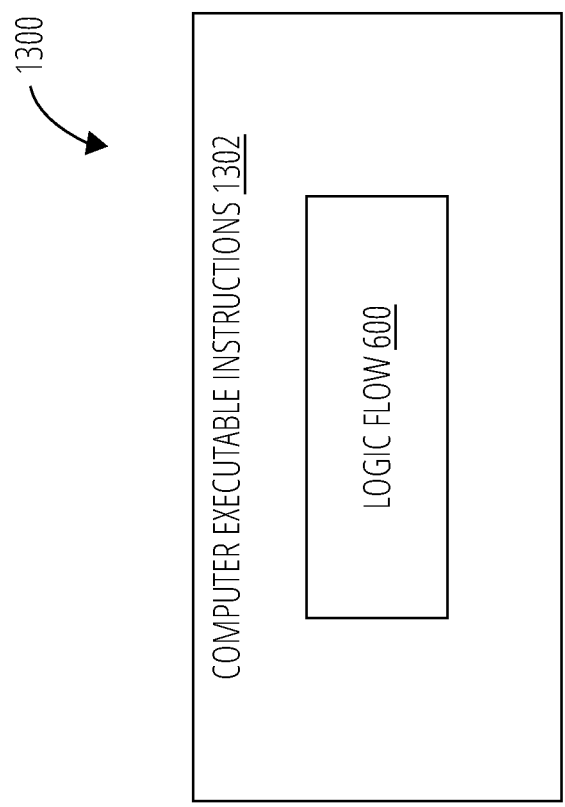
FIG. 13 illustrates a computer-readable storage medium 1300.

FIG. 13 illustrates computer-readable storage medium 1300. Computer-readable storage medium 1300 may comprise any non-transitory computer-readable storage medium or machine-readable storage medium, such as an optical, magnetic or semiconductor storage medium. In various embodiments, computer-readable storage medium 1300 may comprise an article of manufacture. In some embodiments, computer-readable storage medium 1300 may store computer executable instructions 1302 with which circuitry (e.g., processor circuit 1102, processor circuit 1202, radio circuitry 1108, radio circuitry 1208, or the like) can execute. For example, computer executable instructions 1302 can include instructions to implement operations described with respect to logic flow 600. Examples of computer-readable storage medium 1300 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1302 may include any suitable type of code, such as source code, compiled code, interpreted code, executable code, static code, dynamic code, object-oriented code, visual code, and the like.

As outlined, the present disclosure provides techniques to determine or identify time synchronization attacks based on KPIs. The present techniques can be implemented by circuitry and/or implemented in instructions executable by circuitry in a variety of systems, such as, for example, Ethernet network interface cards, Wi-Fi radios, field programmable gate array (FPGA) system-on-chips (SOCs), 5G networks components, autonomous vehicles, or Edge/Client computing platforms. As such an example system using autonomous vehicles is provided.

Figure 14:
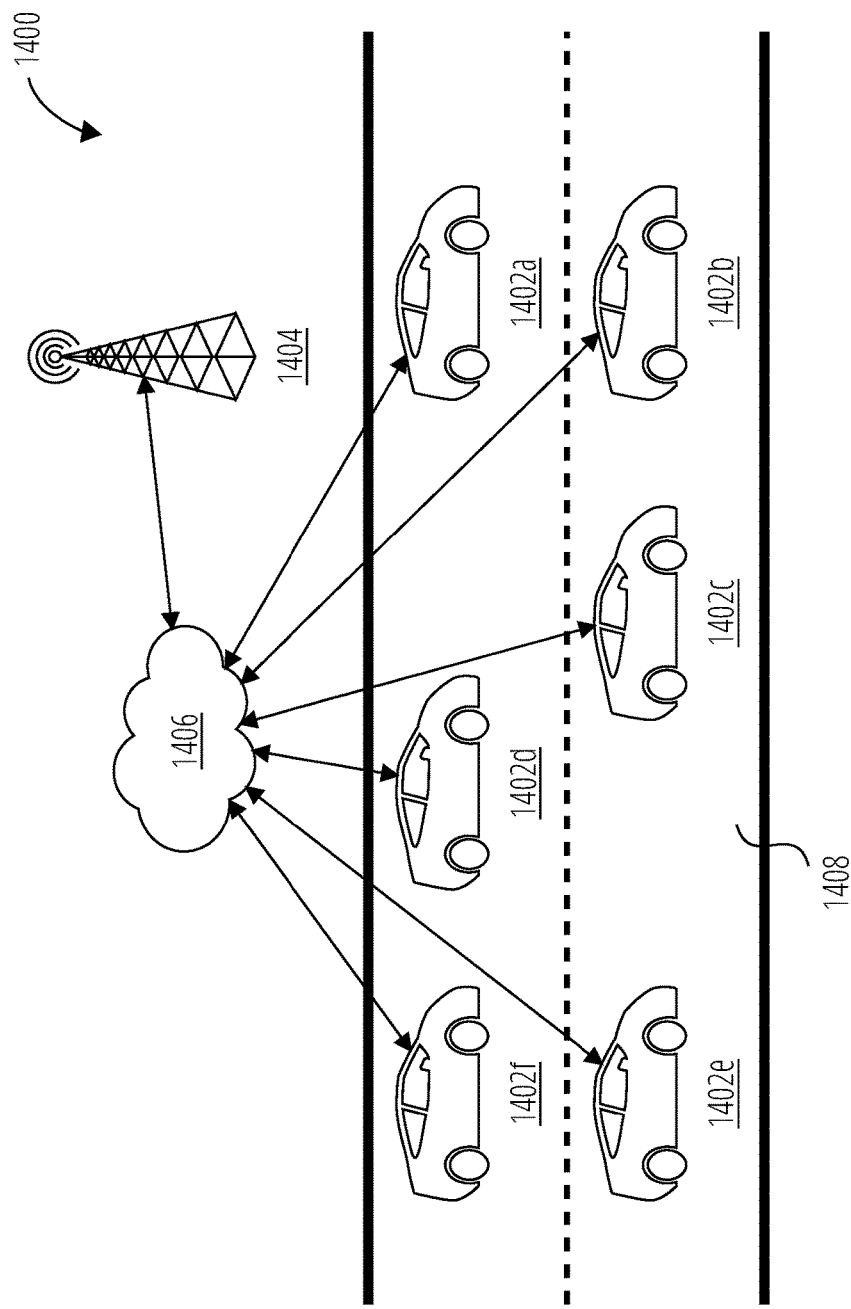
FIG. 14 illustrates a system 1400.

FIG. 14 illustrates a system 1400 including a number of connected vehicles, such as vehicle 1402a, vehicle 1402b, vehicle 1402c, vehicle 1402d, vehicle 1402e, and vehicle 1402f. Vehicle 1402a to vehicle 1402f are depicted traveling on a roadway 1408 with a roadside unit (RSU) 1404 adjacent to the roadway 1408. Although these figures illustrate the RSU 1404 being arranged at a side of the roadway 1408, it may be understood that the RSU 1404 may be arranged anywhere (e.g., top, bottom, etc.) near the roadway 1408 or in any fashion that allows the RSU 1404 to communicate with the vehicles (and vice versa). RSU 1404 may be mobile (e.g., one of vehicles, or the like) and travel on roadway 1408 with the vehicles. Moreover, it may be understood that vehicles 1402a to vehicle 1402f may not be limited to motor-based vehicles (e.g., gas, diesel, electric), but may be any suitable vehicle configured to perform vehicle-to-vehicle (V2V) and/or vehicle-to-anything (V2X) communication, such as railed vehicles (e.g., trains, trams), watercraft (e.g., ships, boats), aircraft (airplanes, spaceships, satellites, etc.) and the like.

Vehicle 1402a to vehicle 1402f and RSU 1404 can communicate with each other over network 1406. In general, communication between devices (e.g., vehicle 1402a to vehicle 1402f and RSU 1404, or the like) can be facilitated by RSU 1404 acting as a routing node for network 1406. For example, RSU 1404 can provide network 1406 to facilitate a Wi-Fi communication scheme. Said differently, vehicle 1402a to vehicle 1402f and RSU 1404 can be arranged to communicate in compliance with one or more standards, and for example, send messages via network 1406 where network 1406 operates based on one or more standards. For example, the communication schemes of the present disclosure, may be based on one or more communication standards, such as, for example, one of the 802.1 or 802.11 standards promulgated by the Institute of Electrical and Electronic Engineers (IEEE), cellular and long-term evolution (LTE) standards promulgated by the $3^{rd}$ Generation Partnership Project (3GPP). Additionally, the messages communicated via network 1406 may be based on one or more standards, such as, SAE J2735, which defines BSM, among other messages.

During operation, vehicle 1402a to vehicle 1402f and/or RSU 1404 can be arranged to transmit (e.g., via network 1406, or the like) information elements comprising indications of data related to travel on roadway 1408 (e.g., vehicle platoon information, autonomous vehicle information roadway safety information, etc.). As a specific example, vehicle 1402b can transmit a message via network 1406 including indications of data (e.g., speed of vehicle 1402b, trajectory of vehicle 1402b, position of vehicle 1402b, acceleration of vehicle 1402b, etc.). Other ones of the vehicles (e.g., vehicle 1402a, vehicle 1402c, etc.) or RSU 1404 can receive the message transmitted by vehicle 1402b via network 1406. As another example, the devices (e.g., RSU 1404, vehicle 1402a, etc.) can be arranged to send and receive basic safety messages (BSM), cooperative awareness messages (CAM), decentralized environmental notification messages (DENM), or the like via network 1406.

Within system 1400, TC data streams can be provisioned and/or data routes established according to TSN protocols. For example, RSU 1404 can establish routes whereas ones of vehicles 1402a, 1402b, etc., operate as switching nodes in network 1406. The vehicles 1402a, 1402b, etc., can be arranged to identify KPIs and/or process KPIs, and communicate the KPI(s) (or processed KPIs) to RSU 1404. Likewise, RSU 1404 can be arranged to detect time synchronization attacks on devices in network 1406 (e.g., based on logic flow 600, or the like). Although devices of system 1400 are not depicted with clocks, it is to be appreciated that the circuitry (e.g., processing circuitry, memory storage circuitry, etc.) will often operate based on a clock.

The following examples pertain to further embodiments, from which numerous permutations and configurations will be apparent.

Example 1. A computing-implemented method, comprising: establishing a data stream between a first device and a second device, the data stream comprising a plurality of switching nodes; providing an indication of a protected transmission window to each of the plurality of switching nodes; receiving, from one of the plurality of switching nodes, a key performance indicator (KPI) relative to the timing of the protected transmission window for the one of the plurality of switching nodes; and determining whether the one of the plurality of switching nodes is subject to a timing attack based on the KPI.

Example 2. The computing-implemented method of example 1, comprising: receiving an indication of values of the KPI over a time period; determining a mean of the values of the KPI over the time period; and determining a standard deviation of the values of the KPI over the time period.

Example 3. The computing-implemented method of example 2, the time period a first time period, receiving, from one of the plurality of switching nodes, a key performance indicator (KPI) relative to the timing of the protected transmission window for the one of the plurality of switching nodes comprising receiving a value of the KPI over a second time period subsequent to the time period.

Example 4. The computing-implemented method of example 3, determining whether the one of the plurality of switching nodes is subject to a timing attack based on the KPI comprising: determining a mean of the values of the KPI over the second time period; determining whether the absolute value of the mean of the values of the KPI over the second time period minus the mean of the values of the KPI over the first time period is greater than or equal to a threshold value; and determining whether the one of the plurality of switching nodes is subject to a timing attack based on a determination that the absolute value of the mean of the values of the KPI over the second time period minus the mean of the values of the KPI over the first time period is greater than or equal to the threshold value.

Example 5. The computing-implemented method of example 4, wherein the threshold is based on the standard deviation of the values of the KPI over the time period.

Example 6. The computing-implemented method of example 5, wherein the threshold value is three (3) times the standard deviation of the values of the KPI over the time period.

Example 7. The computing-implemented method of example 4, determining whether the one of the plurality of switching nodes is subject to a timing attack based on a determination that the absolute value of the mean of the values of the KPI over the second time period minus the mean of the values of the KPI over the first time period is greater than or equal to the threshold value comprising: incrementing a positive event counter based on a determination that the absolute value of the mean of the values of the KPI over the second time period minus the mean of the values of the KPI over the first time period is greater than or equal to the threshold value; or incrementing a negative event counter based on a determination that the absolute value of the mean of the values of the KPI over the second time period minus the mean of the values of the KPI over the first time period is not greater than or equal to the threshold value; and determining the one of the plurality of switching nodes is subject to a timing attack based on a determination that the absolute value of the positive event counter minus the negative event counter is greater than an event counter threshold.

Example 8. The computing-implemented method of example 1, wherein the data stream is established in accordance with the Institute of Electrical and Electronics Engineers (IEEE) 802.1AS and/or 802.1Qbv standards.

Example 9. A computing apparatus comprising: a processor at a control device for a time sensitive network (TSN) of devices; and a memory storing instructions that, when executed by the processor, configure the apparatus to: establish a data stream between a first device and a second device in the TSN of devices, the data stream comprising a plurality of switching nodes in the TSN of device; provide an indication of a protected transmission window to each of the plurality of switching nodes; receive, from one of the plurality of switching nodes, a key performance indicator (KPI) relative to the timing of the protected transmission window for the one of the plurality of switching nodes; and determine whether the one of the plurality of switching nodes is subject to a timing attack based on the KPI.

Example 10. The computing apparatus of example 9, the instructions, when executed by the processor, configure the apparatus to: receive an indication of values of the KPI over a time period; determine a mean of the values of the KPI over the time period; and determine a standard deviation of the values of the KPI over the time period.

Example 11. The computing apparatus of example 10, the time period a first time period, the instructions, when executed by the processor, configure the apparatus to receive a value of the KPI over a second time period subsequent to the time period.

Example 12. The computing apparatus of example 11, the instructions, when executed by the processor, configure the apparatus to: determine a mean of the values of the KPI over the second time period; determine whether the absolute value of the mean of the values of the KPI over the second time period minus the mean of the values of the KPI over the first time period is greater than or equal to a threshold value; and determine whether the one of the plurality of switching nodes is subject to a timing attack based on a determination that the absolute value of the mean of the values of the KPI over the second time period minus the mean of the values of the KPI over the first time period is greater than or equal to the threshold value.

Example 13. The computing apparatus of example 12, wherein the threshold is based on the standard deviation of the values of the KPI over the time period.

Example 14. The computing apparatus of example 13, wherein the threshold value is three (3) times the standard deviation of the values of the KPI over the time period.

Example 15. The computing apparatus of example 12, the instructions, when executed by the processor, configure the apparatus to: increment a positive event counter based on a determination that the absolute value of the mean of the values of the KPI over the second time period minus the mean of the values of the KPI over the first time period is greater than or equal to the threshold value; or increment a negative event counter based on a determination that the absolute value of the mean of the values of the KPI over the second time period minus the mean of the values of the KPI over the first time period is not greater than or equal to the threshold value; and determine the one of the plurality of switching nodes is subject to a timing attack based on a determination that the absolute value of the positive event counter minus the negative event counter is greater than an event counter threshold.

Example 16. The computing apparatus of example 9, wherein the data stream is established in accordance with the Institute of Electrical and Electronics Engineers (IEEE) 802.1AS and/or 802.1Qbv standards.

Example 17. A non-transitory computer-readable storage device, storing instructions that when executed by processing circuitry of a controller of a time sensitive network (TSN), cause the controller to: establish a data stream between a first device and a second device, the data stream comprising a plurality of switching nodes; provide an indication of a protected transmission window to each of the plurality of switching nodes; receive, from one of the plurality of switching nodes, a key performance indicator (KPI) relative to the timing of the protected transmission window for the one of the plurality of switching nodes; and determine whether the one of the plurality of switching nodes is subject to a timing attack based on the KPI.

Example 18. The computer-readable storage medium of example 17, the instructions, when executed by the processing circuitry, cause the controller to: receive an indication of values of the KPI over a time period; determine a mean of the values of the KPI over the time period; and determine a standard deviation of the values of the KPI over the time period.

Example 19. The computer-readable storage medium of example 18, the time period a first time period, the instructions, when executed by the processing circuitry, cause the controller to receive a value of the KPI over a second time period subsequent to the time period.

Example 20. The computer-readable storage medium of example 19, the instructions, when executed by the processing circuitry, cause the controller to: determine a mean of the values of the KPI over the second time period; determine whether the absolute value of the mean of the values of the KPI over the second time period minus the mean of the values of the KPI over the first time period is greater than or equal to a threshold value; and determine whether the one of the plurality of switching nodes is subject to a timing attack based on a determination that the absolute value of the mean of the values of the KPI over the second time period minus the mean of the values of the KPI over the first time period is greater than or equal to the threshold value.

Example 21. The computer-readable storage medium of example 20, wherein the threshold is based on the standard deviation of the values of the KPI over the time period.

Example 22. The computer-readable storage medium of example 21, wherein the threshold value is three (3) times the standard deviation of the values of the KPI over the time period.

Example 23. The computer-readable storage medium of example 20, the instructions, when executed by the processing circuitry, cause the controller to: increment a positive event counter based on a determination that the absolute value of the mean of the values of the KPI over the second time period minus the mean of the values of the KPI over the first time period is greater than or equal to the threshold value; or increment a negative event counter based on a determination that the absolute value of the mean of the values of the KPI over the second time period minus the mean of the values of the KPI over the first time period is not greater than or equal to the threshold value; and determine the one of the plurality of switching nodes is subject to a timing attack based on a determination that the absolute value of the positive event counter minus the negative event counter is greater than an event counter threshold.

Example 24. The computer-readable storage medium of example 17, wherein the data stream is established in accordance with the Institute of Electrical and Electronics Engineers (IEEE) 802.1AS and/or 802.1Qbv standards.

Example 25. An apparatus, comprising: means for establishing a data stream between a first device and a second device, the data stream comprising a plurality of switching nodes; means for providing an indication of a protected transmission window to each of the plurality of switching nodes; means for receiving, from one of the plurality of switching nodes, a key performance indicator (KPI) relative to the timing of the protected transmission window for the one of the plurality of switching nodes; and means for determining whether the one of the plurality of switching nodes is subject to a timing attack based on the KPI.

Example 26. The apparatus of example 25, comprising: means for receiving an indication of values of the KPI over a time period; means for determining a mean of the values of the KPI over the time period; and means for determining a standard deviation of the values of the KPI over the time period.

Example 27. The apparatus of example 26, the time period a first time period, the apparatus comprising means for receiving a value of the KPI over a second time period subsequent to the time period.

Example 28. The apparatus of example 27, comprising: means for determining a mean of the values of the KPI over the second time period; means for determining whether the absolute value of the mean of the values of the KPI over the second time period minus the mean of the values of the KPI over the first time period is greater than or equal to a threshold value; and means for determining whether the one of the plurality of switching nodes is subject to a timing attack based on a determination that the absolute value of the mean of the values of the KPI over the second time period minus the mean of the values of the KPI over the first time period is greater than or equal to the threshold value.

Example 29. The apparatus of example 28, wherein the threshold is based on the standard deviation of the values of the KPI over the time period.

Example 30. The apparatus of example 29, wherein the threshold value is three (3) times the standard deviation of the values of the KPI over the time period.

Example 31. The apparatus of example 28, comprising: means for incrementing a positive event counter based on a determination that the absolute value of the mean of the values of the KPI over the second time period minus the mean of the values of the KPI over the first time period is greater than or equal to the threshold value; or means for incrementing a negative event counter based on a determination that the absolute value of the mean of the values of the KPI over the second time period minus the mean of the values of the KPI over the first time period is not greater than or equal to the threshold value; and means for determining the one of the plurality of switching nodes is subject to a timing attack based on a determination that the absolute value of the positive event counter minus the negative event counter is greater than an event counter threshold.

Example 32. The apparatus of example 25, wherein the data stream is established in accordance with the Institute of Electrical and Electronics Engineers (IEEE) 802.1AS and/or 802.1Qbv standards.

What is claimed is:

1. A computing-implemented method, comprising:
   establishing a data stream between a first device and a second device, the data stream comprising a plurality of switching nodes;
   providing an indication of a protected transmission window to each of the plurality of switching nodes;
   receiving, from one of the plurality of switching nodes, a key performance indicator (KPI) relative to the timing of the protected transmission window for the one of the plurality of switching nodes, wherein the KPI represents a delay time or a time buffer of a packet from the data stream within the protected transmission window; and
   determining whether the one of the plurality of switching nodes is subject to a timing attack based on the KPI.

2. The computing-implemented method of claim 1, comprising:

receiving an indication of values of the KPI over a time period;
determining a mean of the values of the KPI over the time period; and
determining a standard deviation of the values of the KPI over the time period.

3. The computing-implemented method of claim 2, wherein the time period is a first time period, wherein receiving, from the one of the plurality of switching nodes, the KPI relative to the timing of the protected transmission window for the one of the plurality of switching nodes comprises receiving a value of the KPI over a second time period subsequent to the time period.

4. The computing-implemented method of claim 3, determining whether the one of the plurality of switching nodes is subject to a timing attack based on the KPI comprising:
determining a mean of the values of the KPI over the second time period;
determining whether an absolute value of the mean of the values of the KPI over the second time period minus the mean of the values of the KPI over the first time period is greater than or equal to a threshold value; and
determining whether the one of the plurality of switching nodes is subject to a timing attack based on a determination that the absolute value of the mean of the values of the KPI over the second time period minus the mean of the values of the KPI over the first time period is greater than or equal to the threshold value.

5. The computing-implemented method of claim 4, wherein the threshold is based on the standard deviation of the values of the KPI over the time period.

6. The computing-implemented method of claim 5, wherein the threshold value is three (3) times the standard deviation of the values of the KPI over the time period.

7. The computing-implemented method of claim 4, determining whether the one of the plurality of switching nodes is subject to a timing attack based on a determination that the absolute value of the mean of the values of the KPI over the second time period minus the mean of the values of the KPI over the first time period is greater than or equal to the threshold value comprising:
incrementing a positive event counter based on a determination that the absolute value of the mean of the values of the KPI over the second time period minus the mean of the values of the KPI over the first time period is greater than or equal to the threshold value; or
incrementing a negative event counter based on a determination that the absolute value of the mean of the values of the KPI over the second time period minus the mean of the values of the KPI over the first time period is not greater than or equal to the threshold value; and
determining the one of the plurality of switching nodes is subject to a timing attack based on a determination that an absolute value of the positive event counter minus the negative event counter is greater than an event counter threshold.

8. The computing-implemented method of claim 1, wherein the data stream is established in accordance with the Institute of Electrical and Electronics Engineers (IEEE) 802.1AS and/or 802.1Qbv standards.

9. A computing apparatus comprising:
a processor at a control device for a time sensitive network (TSN) of devices; and
a memory storing instructions that, when executed by the processor, configure the apparatus to:
establish a data stream between a first device and a second device in the TSN of devices, the data stream comprising a plurality of switching nodes in the TSN of devices;
provide an indication of a protected transmission window to each of the plurality of switching nodes;
receive, from one of the plurality of switching nodes, a key performance indicator (KPI) relative to the timing of the protected transmission window for the one of the plurality of switching nodes, wherein the KPI represents a delay time or a time buffer of a packet from the data stream within the protected transmission window; and
determine whether the one of the plurality of switching nodes is subject to a timing attack based on the KPI.

10. The computing apparatus of claim 9, the instructions, when executed by the processor, configure the apparatus to:
receive an indication of values of the KPI over a time period;
determine a mean of the values of the KPI over the time period; and
determine a standard deviation of the values of the KPI over the time period.

11. The computing apparatus of claim 10, wherein the time period is a first time period, the instructions, when executed by the processor, configure the apparatus to receive a value of the KPI over a second time period subsequent to the time period.

12. The computing apparatus of claim 11, the instructions, when executed by the processor, configure the apparatus to:
determine a mean of the values of the KPI over the second time period;
determine whether an absolute value of the mean of the values of the KPI over the second time period minus the mean of the values of the KPI over the first time period is greater than or equal to a threshold value; and
determine whether the one of the plurality of switching nodes is subject to a timing attack based on a determination that the absolute value of the mean of the values of the KPI over the second time period minus the mean of the values of the KPI over the first time period is greater than or equal to the threshold value.

13. The computing apparatus of claim 12, wherein the threshold is based on the standard deviation of the values of the KPI over the time period.

14. The computing apparatus of claim 13, wherein the threshold value is three (3) times the standard deviation of the values of the KPI over the time period.

15. The computing apparatus of claim 12, the instructions, when executed by the processor, configure the apparatus to:
increment a positive event counter based on a determination that the absolute value of the mean of the values of the KPI over the second time period minus the mean of the values of the KPI over the first time period is greater than or equal to the threshold value; or
increment a negative event counter based on a determination that the absolute value of the mean of the values of the KPI over the second time period minus the mean of the values of the KPI over the first time period is not greater than or equal to the threshold value; and
determine the one of the plurality of switching nodes is subject to a timing attack based on a determination that an absolute value of the positive event counter minus the negative event counter is greater than an event counter threshold.

16. The computing apparatus of claim 9, wherein the data stream is established in accordance with the Institute of Electrical and Electronics Engineers (IEEE) 802.1AS and/or 802.1Qbv standards.

17. A non-transitory computer-readable storage device, storing instructions that when executed by processing circuitry of a controller of a time sensitive network (TSN), cause the controller to:
- establish a data stream between a first device and a second device, the data stream comprising a plurality of switching nodes;
- provide an indication of a protected transmission window to each of the plurality of switching nodes;
- receive, from one of the plurality of switching nodes, a key performance indicator (KPI) relative to the timing of the protected transmission window for the one of the plurality of switching nodes, wherein the KPI represents a delay time or a time buffer of a packet from the data stream within the protected transmission window; and
- determine whether the one of the plurality of switching nodes is subject to a timing attack based on the KPI.

18. The computer-readable storage device of claim 17, the instructions, when executed by the processing circuitry, cause the controller to:
- receive an indication of values of the KPI over a time period;
- determine a mean of the values of the KPI over the time period; and
- determine a standard deviation of the values of the KPI over the time period.

19. The computer-readable storage device of claim 18, wherein the time period is a first time period, the instructions, when executed by the processing circuitry, cause the controller to receive a value of the KPI over a second time period subsequent to the time period.

20. The computer-readable storage device of claim 19, the instructions, when executed by the processing circuitry, cause the controller to:
- determine a mean of the values of the KPI over the second time period;
- determine whether an absolute value of the mean of the values of the KPI over the second time period minus the mean of the values of the KPI over the first time period is greater than or equal to a threshold value; and
- determine whether the one of the plurality of switching nodes is subject to a timing attack based on a determination that the absolute value of the mean of the values of the KPI over the second time period minus the mean of the values of the KPI over the first time period is greater than or equal to the threshold value.

21. The computer-readable storage device of claim 20, wherein the threshold is based on the standard deviation of the values of the KPI over the time period.

22. The computer-readable storage device of claim 21, wherein the threshold value is three (3) times the standard deviation of the values of the KPI over the time period.

23. The computer-readable storage device of claim 20, the instructions, when executed by the processing circuitry, cause the controller to:
- increment a positive event counter based on a determination that the absolute value of the mean of the values of the KPI over the second time period minus the mean of the values of the KPI over the first time period is greater than or equal to the threshold value; or
- increment a negative event counter based on a determination that the absolute value of the mean of the values of the KPI over the second time period minus the mean of the values of the KPI over the first time period is not greater than or equal to the threshold value; and
- determine the one of the plurality of switching nodes is subject to a timing attack based on a determination that an absolute value of the positive event counter minus the negative event counter is greater than an event counter threshold.

24. The computer-readable storage device of claim 17, wherein the data stream is established in accordance with the Institute of Electrical and Electronics Engineers (IEEE) 802.1AS and/or 802.1Qbv standards.

* * * * *